(12) United States Patent
Osaka

(10) Patent No.: US 7,907,175 B2
(45) Date of Patent: Mar. 15, 2011

(54) TRACKING IMAGE PICKUP DEVICE HAVING A ROUGH ROTATION AND A FINE ROTATION PART

(75) Inventor: Tsutomu Osaka, Yokohama (JP)

(73) Assignee: Canon Kabushiki Kaisha (JP)

( * ) Notice: Subject to any disclaimer, the term of this patent is extended or adjusted under 35 U.S.C. 154(b) by 1202 days.

(21) Appl. No.: 11/468,144

(22) Filed: Aug. 29, 2006

(65) Prior Publication Data

US 2007/0046784 A1    Mar. 1, 2007

(30) Foreign Application Priority Data

Aug. 30, 2005   (JP) .................................. 2005-250114

(51) Int. Cl.
*H04N 5/228*   (2006.01)
(52) U.S. Cl. .................................. 348/208.7; 348/208.3
(58) Field of Classification Search ............... 348/208.4, 348/208.7, 208.11, 208.14, 208.3
See application file for complete search history.

(56) References Cited

U.S. PATENT DOCUMENTS

| | | | | |
|---|---|---|---|---|
| 5,561,498 A | * | 10/1996 | Sekine et al. ................... | 396/53 |
| 5,764,786 A | * | 6/1998 | Kuwashima et al. ......... | 382/107 |
| 6,233,009 B1 | * | 5/2001 | Morofuji et al. ........... | 348/208.8 |
| 6,404,455 B1 | * | 6/2002 | Ito et al. ......................... | 348/169 |
| 6,704,502 B2 | * | 3/2004 | Morofuji ......................... | 396/55 |
| 6,734,902 B1 | * | 5/2004 | Kawahara ................... | 348/208.8 |
| 7,248,286 B2 | * | 7/2007 | Cho ......................... | 348/208.14 |
| 7,400,823 B2 | * | 7/2008 | Kakiuchi ......................... | 396/55 |
| 2002/0054213 A1 | * | 5/2002 | Kawahara et al. ............. | 348/208 |
| 2005/0018879 A1 | * | 1/2005 | Ito et al. ......................... | 382/103 |
| 2005/0062852 A1 | * | 3/2005 | Yamazaki ................... | 348/208.6 |

FOREIGN PATENT DOCUMENTS

| | | |
|---|---|---|
| JP | 08-116487 | 5/1996 |
| JP | 11-122526 A | 4/1999 |
| JP | 3610604 B2 | 10/2004 |

* cited by examiner

*Primary Examiner* — Nicholas G Giles
(74) *Attorney, Agent, or Firm* — Rossi, Kimms & McDowell LLP

(57) ABSTRACT

A tracking image pickup device which makes it possible to perform high-speed and high-accuracy drive and tilting drive without sacrificing the rigidity of the device. An image pickup section has a predetermined optical system and acquires an image pickup signal through the optical system. A tracking target-detecting section detects a tracking target from the image pickup signal acquired by the image pickup section. A drive section has a fine movement part formed by a part of the optical system, and a rough movement part, so as to turn the tracking image pickup device in a panning or tilting direction. A control command value-computing section drivingly controls the drive section such that an amount of deviation between the tracking target and an image pickup direction of the tracking image pickup device is reduced. An image pickup direction-computing section determines the image pickup direction of the tracking image pickup device.

3 Claims, 19 Drawing Sheets

*FIG. 13A*  *FIG. 13B*
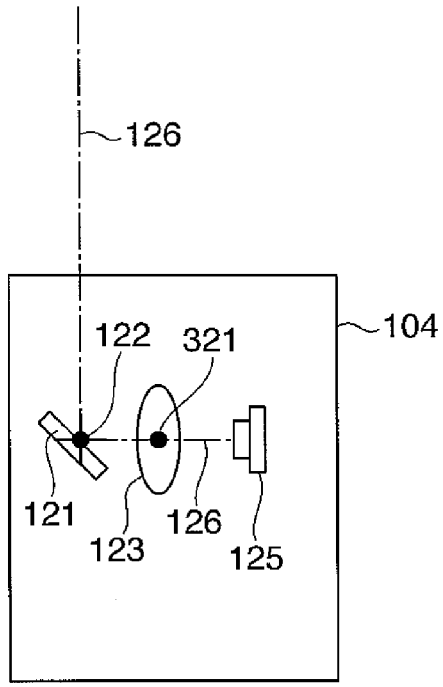
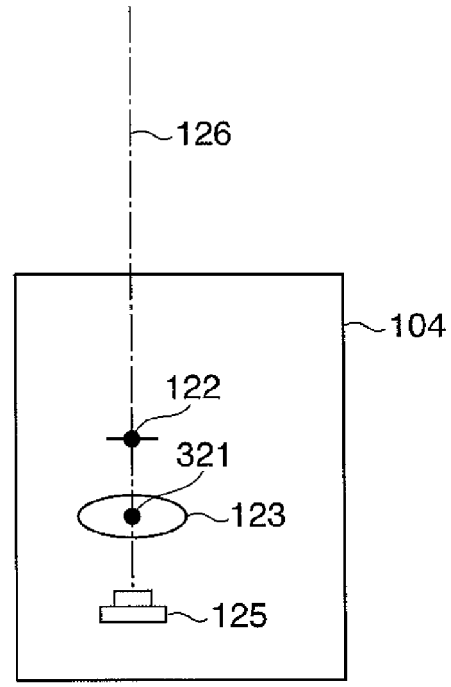

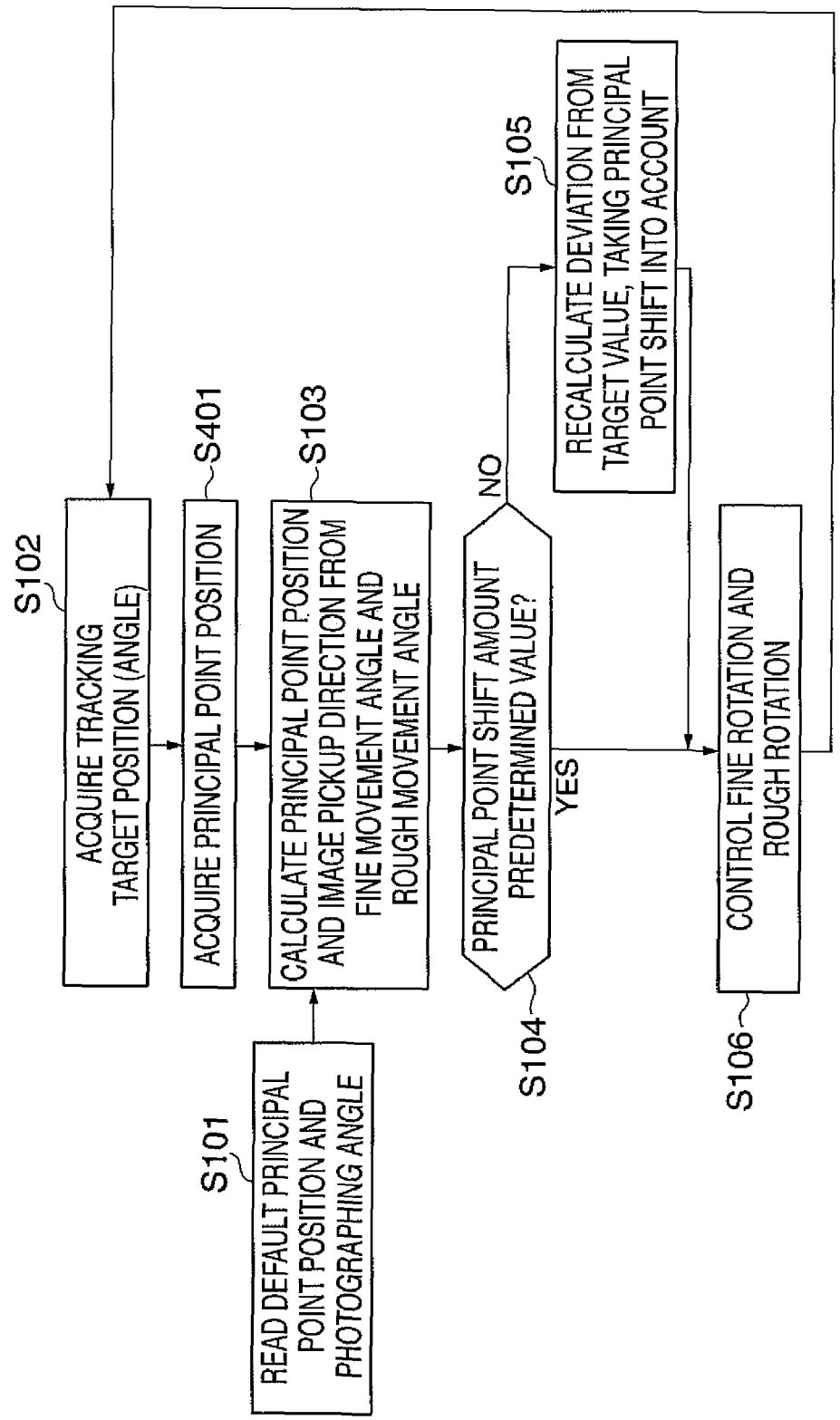

*FIG. 18A*  *FIG. 18B*
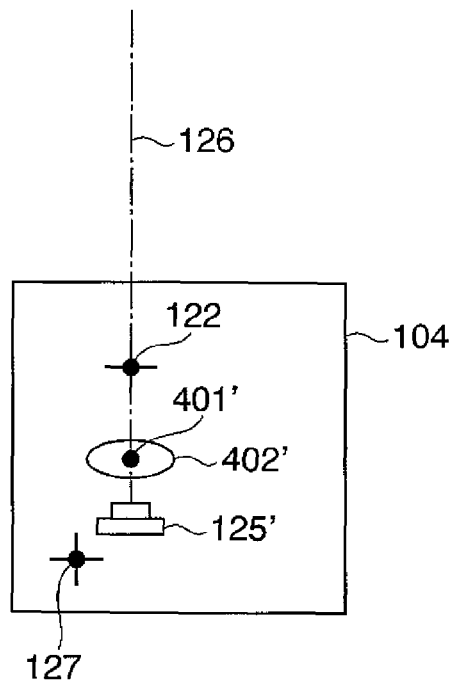 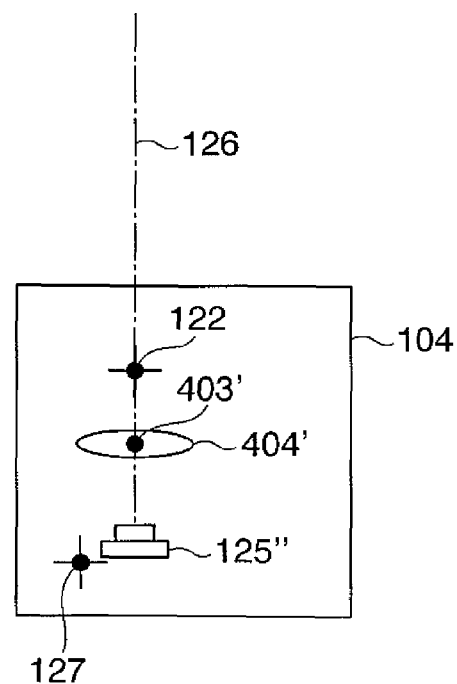

TRACKING IMAGE PICKUP DEVICE HAVING A ROUGH ROTATION AND A FINE ROTATION PART

BACKGROUND OF THE INVENTION

1. Field of the Invention

The present invention relates to a tracking image pickup device and a tracking control method therefor, which is capable of tracking a tracking target while changing an image pickup direction, as well as a control program for implementing the tracking control method.

2. Description of the Related Art

Conventionally, there have been proposed various kinds of tracking image pickup devices that use an image pickup device and are capable of detecting a tracking object and performing tracking control of an image pickup direction such that the image of the object is brought e.g. to a central part of a screen.

In general, in a tracking image pickup device of the above-mentioned types a panning (horizontal) drive mechanism and a tilting (vertical) drive mechanism are controlled so as to reduce the amount of deviation between the position of an object as a tracking target and an image pickup direction. This control will be described with reference to FIG. 19.

FIG. 19 is a flowchart of a general panning and tilting control process executed by a conventional tracking image pickup device (which will be referred to as "the prior art 1").

First, when the power of the system is turned on, or in response to a user's instruction or the like, the process is started (step S901). Then, initialization is performed e.g. by moving a panning mechanism and a tilting mechanism to a turning center (step S902). Thereafter, a tracking target is detected based on the characteristics of a tracking object (step S903), and the difference between the position of the detected tracking target and the image pickup direction, i.e. the difference between a panning direction and a tilting direction is calculated. Further, a control signal corresponding to the deviation is calculated (step S904), and the panning mechanism and the tilting mechanism are driven by the control signal (step S905). Then, the steps S903 to S905 are repeatedly carried out, whereby tracking image pickup of the object is enabled.

Further, a tracking device has been disclosed which is capable of changing a servo coefficient according to a zoom magnification (lens view angle range) of a photographic lens (see e.g. Japanese Patent No. 3610604, which will be referred to as "the prior art 2"). In the case where the relation between deviation of an object as a tracking target from the center of a screen and the amount of motor control is held constant without regard to a zoom magnification, when the zoom magnification is high, an apparatus or a device becomes excessively responsive to the movement of the object, which causes unstable control. On the other hand, when the zoom magnification is low, operation of the device becomes slow, making it difficult to move the image of the object to the screen center, so that the object can easily be missed. The tracking device according to the prior art 2 is capable of performing tracking control based on an appropriate parameter of a servo system corresponding to a zoom magnification.

Furthermore, a tracking image pickup device has been proposed which is capable of picking up the image of a moving object by tracking the object while changing its imaging magnification (see e.g. Japanese Laid-Open Patent Publication (Kokai) No. H11-122526, which will be referred to as "the prior art 3"). In this tracking image pickup device, each of a tilt rotation unit and a pan rotation unit is comprised of a rough rotation part and a fine rotation part. For wide-angle image pickup operation, the rough rotation part is operated, while for enlarged image pickup operation, the fine rotation part is operated. The fine rotation part which uses a laminated piezoelectric element is capable of performing fine adjustment in an image pickup direction without causing vibration due to motor rotation. Further, since the laminated piezoelectric element is directly driven, the fine rotation part can be driven at high speed.

However, during panning control, the prior arts 1 and 2 rotationally control a whole image pickup system including a lens, a lens barrel (a lens holding member, an autofocus driving part, a zoom driving part, etc.), an image pickup sensor, and a tilting mechanism (this image pickup system will be hereinafter referred to as "the panning image pickup system"). On the other hand, during tilting control, they rotationally control a whole image pickup system including the lens, the lens barrel, the image pickup sensor, and a panning mechanism (this image pickup system will be hereinafter referred to as "the tilting image pickup system").

For this reason, the rotational speed of the panning image pickup system or the tilting image pickup system is influenced by the balance between the moment of inertia of the associated image pickup system and its drive mechanism, and a driving actuator. In other words, it is required to reduce the moment of inertia of the image pickup system and its drive mechanism to speed up panning drive or tilting drive. To reduce the moment of inertia, the thickness of each component part is reduced to reduce the weight of each part. However, the reduction of the thickness of each component part causes degradation of the rigidity of the device. When the rigidity of the device is degraded, the natural frequency of the device is lowered to a low frequency range, which results in degradation of responsivity of the control system of the device.

Thus, in the prior arts 1 and 2, so as to achieve high-speed tracking control by increasing the speed of panning drive or tilting drive, apparatus rigidity is often sacrificed, which makes it difficult to design the device.

In contrast, the prior art 3 can attain more stable and high-speed fine adjustment by fine movement and rough movement. However, since the laminated piezoelectric element is used, the fine adjustment is limited to a considerably small range.

SUMMARY OF THE INVENTION

It is an object of the present invention to provide a tracking image pickup device, a tracking control method therefor, and a control program for implementing the tracking control method, which makes it possible to perform high-speed and high-accuracy panning drive and tilting drive without sacrificing the rigidity of the device.

To attain the above object, in a first aspect of the present invention, there is provided a tracking image pickup device comprising: an image pickup section that has a predetermined optical system and acquires an image pickup signal through the optical system; a tracking target-detecting section that detects a tracking target from the image pickup signal acquired by the image pickup section; a drive section that has a fine movement part formed by a part of the optical system, and a rough movement part, so as to turn the tracking image pickup device in a panning or tilting direction; a control section that drivingly controls the drive section such that an amount of deviation between the tracking target and an image pickup direction of the tracking image pickup device is reduced; and an image pickup direction-computing section that determines the image pickup direction of the tracking image pickup device based on a fine-rotational axis position as a position of a rotational axis of the fine movement part, a rough-rotational axis position as a position of a rotational axis of the rough movement part, and a lens principal point position or an entrance pupil position of the predetermined optical system.

Preferably, the image pickup direction-computing section includes an image pickup direction-determining section that determines the image pickup direction based on a shift amount and a rotational angle of the lens principal point position or the entrance pupil position corresponding to an amount of fine movement by the fine movement part and an amount of rough movement by the rough movement part.

Preferably, when the shift amount and the rotational angle of the lens principal point position or the entrance pupil position is not larger than a predetermined value, the image pickup direction-determining section determines the image pickup direction, considering that the lens principal point position or the entrance pupil position is not shifted.

Preferably, the rough movement part is controlled with a lower frequency response characteristic than the fine movement part is, while the fine movement part is controlled with a higher frequency response characteristic than the rough movement part is.

Preferably, the tracking image pickup device further comprising a differential operation section that carries out first-order differential operation of an amount of deviation between the tracking target and the image pickup direction, and a rough movement/fine movement control section that controls a fine movement amount of the fine movement part and a rough movement amount of the rough movement part based on a result of the differential operation by the differential operation section.

More preferably, when a first-order differential value obtained by the differential operation section is not larger than a predetermined value, the rough movement/fine movement control section performs driving only by rough movement.

Further, preferably the predetermined value of the first-order differential value obtained by the differential operation section corresponds to a maximum value of a rough movement tracking speed.

Preferably, the rough-rotational axis position and the fine-rotational axis position are configured to coincide with each other, and the image pickup direction-computing section has a section that calculates a shift of the lens principal point position or the entrance pupil position using a single coordinate system.

Preferably, the rough-rotational axis position and the lens principal point position or the entrance pupil position coincide with each other.

Preferably, the fine-rotational axis position and the lens principal point position or the entrance pupil position coincide with each other.

Preferably, the fine-rotational axis position, the rough-rotational axis position, and the lens principal point position or the entrance pupil position coincide with one another.

Preferably, the tracking image pickup device further comprises a zoom part capable of performing a zoom operation for changing a lens view angle range as desired, and a position acquisition section that acquires the lens principal point position or the entrance pupil position of the zoom part, and the image pickup direction-computing section determines the image pickup direction based on the lens principal point position or the entrance pupil position acquired by the position acquisition section.

Preferably, the tracking image pickup device further comprises a zoom part capable of performing a zoom operation for changing a lens view angle range as desired, and a position fixing control section that controls movement of a whole or a part of the optical system according to a zoom magnification of the zoom part to thereby hold the lens principal point position or the entrance pupil position after the zoom operation in a fixed position.

To attain the above object, in a second aspect of the present invention, there is provided a tracking control method for a tracking image pickup device including an image pickup section that has a predetermined optical system and acquires an image pickup signal through the optical system, a tracking target-detecting section that detects a tracking target from the image pickup signal acquired by the image pickup section, and a drive section that has a fine movement part formed by a part of the optical system, and a rough movement part, so as to turn the tracking image pickup device in a panning or tilting direction, comprising: a control step of drivingly controlling the drive section such that an amount of deviation between the tracking target and an image pickup direction of the tracking image pickup device is reduced; and an image pickup direction-computing step of determining the image pickup direction of the tracking image pickup device based on a fine-rotational axis position as a position of a rotational axis of the fine movement part, a rough-rotational axis position as a position of a rotational axis of the rough movement part, and a lens principal point position or an entrance pupil position of the predetermined optical system.

To attain the above object, in a third aspect of the present invention, there is provided a control program for causing a computer to executing a tracking control method for a tracking image pickup device comprising an image pickup section that has a predetermined optical system and acquires an image pickup signal through the optical system, a tracking target-detecting section that detects a tracking target from the image pickup signal acquired by the image pickup section, and a drive section that has a fine movement part formed by a part of the optical system, and a rough movement part, so as to turn the tracking image pickup device in a panning or tilting direction, comprising: a control module for drivingly controlling the drive section such that an amount of deviation between the tracking target and an image pickup direction of the tracking image pickup device is reduced; and an image pickup direction-computing module for determining the image pickup direction of the tracking image pickup device based on a fine-rotational axis position as a position of a rotational axis of the fine movement part, a rough-rotational axis position as a position of a rotational axis of the rough movement part, and a lens principal point position or an entrance pupil position of the predetermined optical system.

According to the present invention, drive and tilting drive can be sped up without sacrificing the rigidity of the device, which makes it easier to design the device, and further the fine movement mechanism makes it easier to improve resolution and accuracy in an image pickup direction. This makes it possible to realize a high-speed and high-accuracy tracking image pickup device provided with a fine movement function and a rough movement function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIGS. 13A and 13B are schematic views showing optical and geometrical relationship in a panning drive section of a variation of the third embodiment.

FIG. 17 is a flowchart of a tracking process executed by of the tracking image pickup device according to the fourth embodiment.

FIGS. 18A and 18B are views useful in explaining how to cancel principal point shift due to zoom operation.

DETAILED DESCRIPTION OF THE PREFERRED EMBODIMENTS

Preferred embodiments of the present invention will be described in detail below with reference to the drawings.

Figure 1:
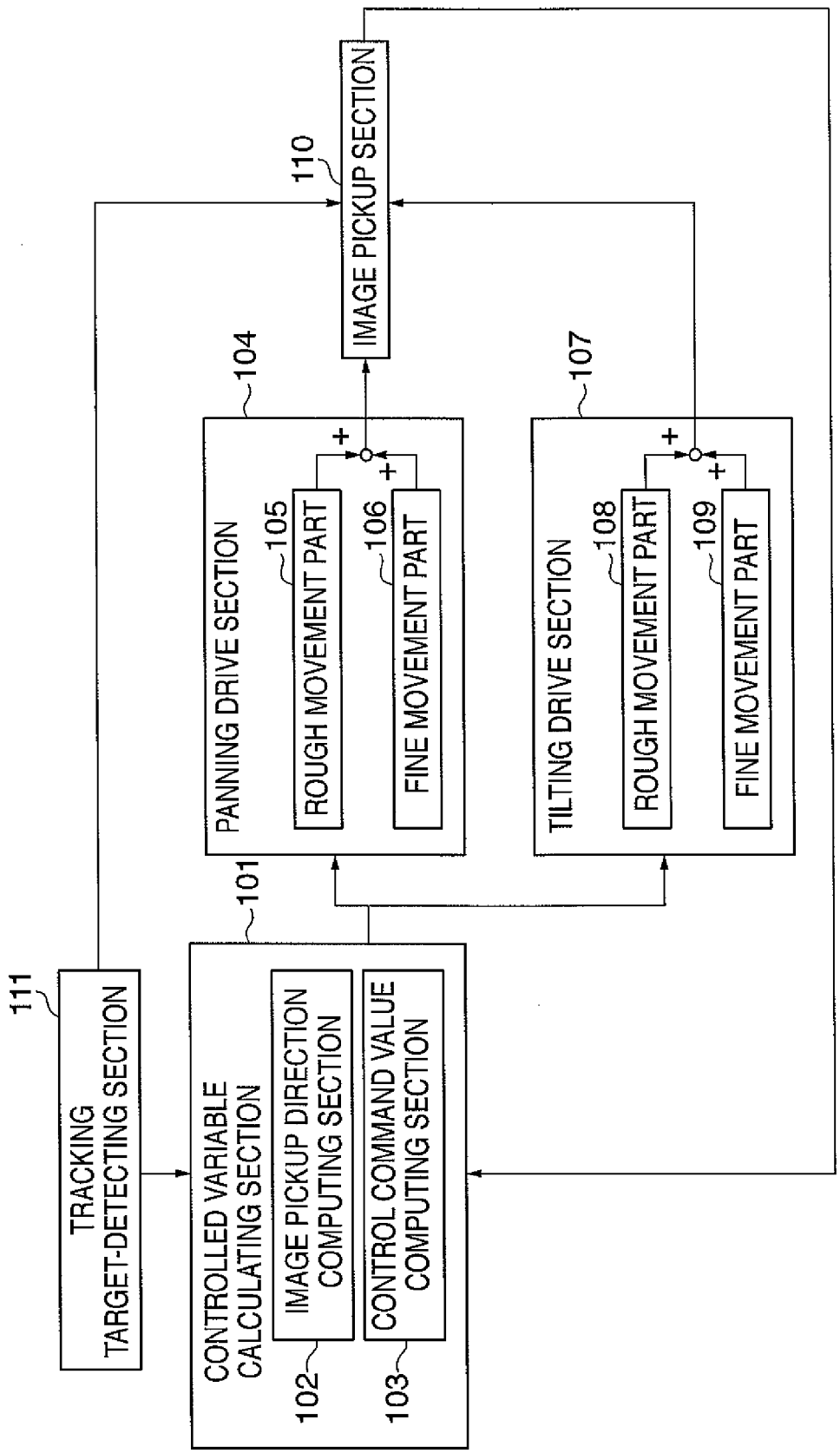
FIG. 1 is a general block diagram of an entire tracking image pickup device according to a first embodiment of the present invention.

FIG. 1 is a block diagram showing the whole arrangement of a tracking image pickup device according to a first embodiment of the present invention.

This tracking image pickup device is comprised of a controlled variable calculating section 101, a panning drive section 104, a tilting drive section 107, an image pickup section 110, and a tracking target-detecting section 111.

The controlled variable calculating section 101 is a computing section that performs control of an image pickup direction, and is basically comprised of an image pickup direction-computing section 102 and a control command value computing section 103. The image pickup direction-computing section 102 computes a lens principal point position or an entrance pupil position and an image pickup direction based on specifications of fine movement parts 106 and 109, rough movement parts 105 and 108, and an optical system, which provide characterizing features of the present embodiment, and a rough movement rotational angle, and a fine movement rotational angle. The control command value computing section 103 computes a controlled variable such that the difference between a tracking target and an image pickup direction is reduced. In tracking control in the present embodiment, panning drive and tilting drive are controlled such that an image of a tracking target is formed in the center of a screen.

The panning drive section 104 is comprised of said rough movement part 105 and said fine movement part 106. In the present embodiment, said fine movement part 106 operates at a higher speed than said rough movement part 105. The tilting drive section 107 is comprised of said rough movement part 108 and said fine movement part 109. Similarly to the panning drive section 104, said fine movement part 109 operates at a higher speed than said rough movement part 108.

The image pickup section 110 is comprised of an image pickup module including an image pickup element and lenses. The image pickup section 110 delivers an image picked up through the image pickup module to the tracking target-detecting section 111, and sends a signal indicative of the status of the image pickup section 110 to the controlled variable calculating section 101 at the same time. The tracking target-detecting section 111 finds a tracking target based on predetermined properties of the image picked up by the image pickup section 110, and detects the location of the tracking target.

Figure 2:
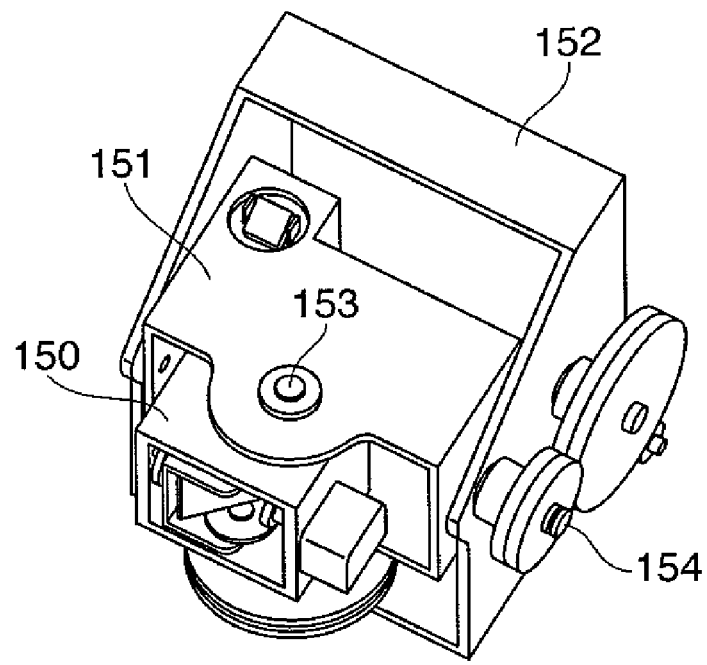
FIG. 2 is a perspective view of the mechanism of a panning drive section and a tilting drive section both appearing in FIG. 1.

FIG. 2 is a perspective view showing the mechanism of the panning drive section 104 and the tilting drive section 107 both appearing in FIG. 1.

Reference numeral 150 in FIG. 2 designates a fine movement mechanism of the panning drive section 104 and the tilting drive section 107 (hereinafter referred to as "the fine panning/tilting mechanism"). The fine panning/tilting mechanism 150 corresponds to said fine movement parts 106 and 109 in FIG. 1. Reference numeral 151 designates a rough movement mechanism of the panning drive section 104 (hereinafter referred to as "the rough panning mechanism"). The rough panning mechanism 151 corresponds to said rough movement part 105 in FIG. 1. Reference numeral 152 designates a rough movement mechanism of the tilting drive section 107 (hereinafter referred to as "the rough tilting mechanism"). The rough tilting mechanism 152 corresponds to said rough movement part 108 in FIG. 1. Reference numeral 153 designates a rough rotating shaft of the panning drive section 104 (hereinafter referred to as "the rough panning shaft"), and reference numeral 154 designates a rough rotating shaft of the tilting drive section 107.

With the mechanism of the pan/tilting drive section shown in FIG. 2, it is possible to provide rotational control on the rough movement and fine movement of the panning drive section 104 and the fine movement and rough movement of the tilting drive section 107 independently of each other. The rough panning mechanism 151 and the fine panning/tilting mechanism 150 are installed on the rough tilting mechanism 152, and the fine panning/tilting mechanism 150 is installed on the rough panning mechanism 151. The rough panning shaft 153 and a fine panning shaft (designated by reference numeral 165 in FIG. 3) are not coaxial with each other.

Figure 3:
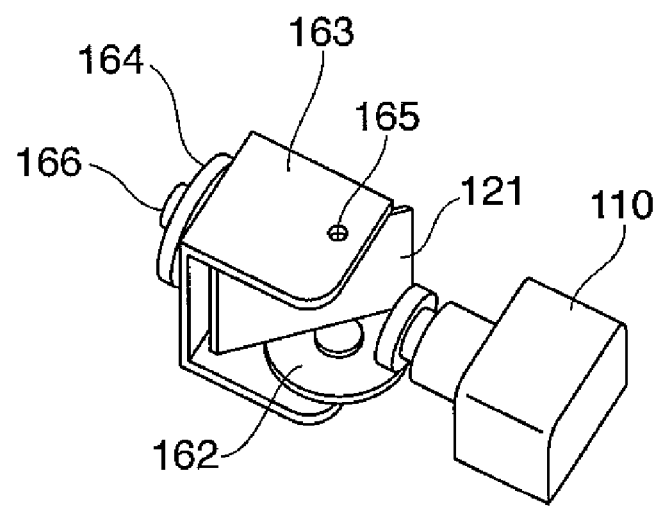
FIG. 3 is a perspective view of essential parts of a fine panning/tilting mechanism in FIG. 2.

FIG. 3 is a perspective view of essential parts of the fine panning/tilting mechanism 150 in FIG. 2.

Reference numeral 121 designates a rotary mirror, and 162 a fine movement actuator that rotatingly drives the rotary mirror 121 in the panning direction. Reference numeral 163 designates an angle member that holds the rotary mirror 121 and the fine movement actuator 162, and 164 a fine movement actuator that causes fine rotation of the angle member 163 in the tilting direction. Reference numeral 165 designates the fine panning shaft (rotating shaft as a rotational axis about which fine rotation in the panning direction is performed), and 166 a rotating shaft as a rotational axis about which fine rotation in the tilting direction is performed. Thus, the rotary mirror 121 can be rotated through an arbitrary angle by the fine movement actuators 162 and 164.

Figure 4A:
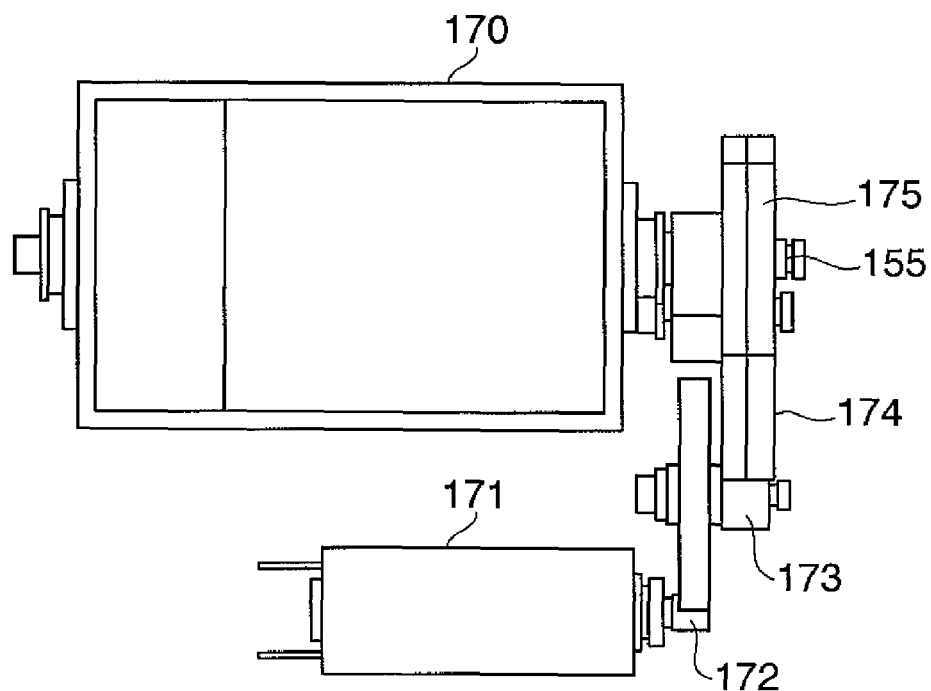
FIGS. 4A and 4B are views of a rough tilting mechanism appearing in FIG. 2.
Figure 4B:
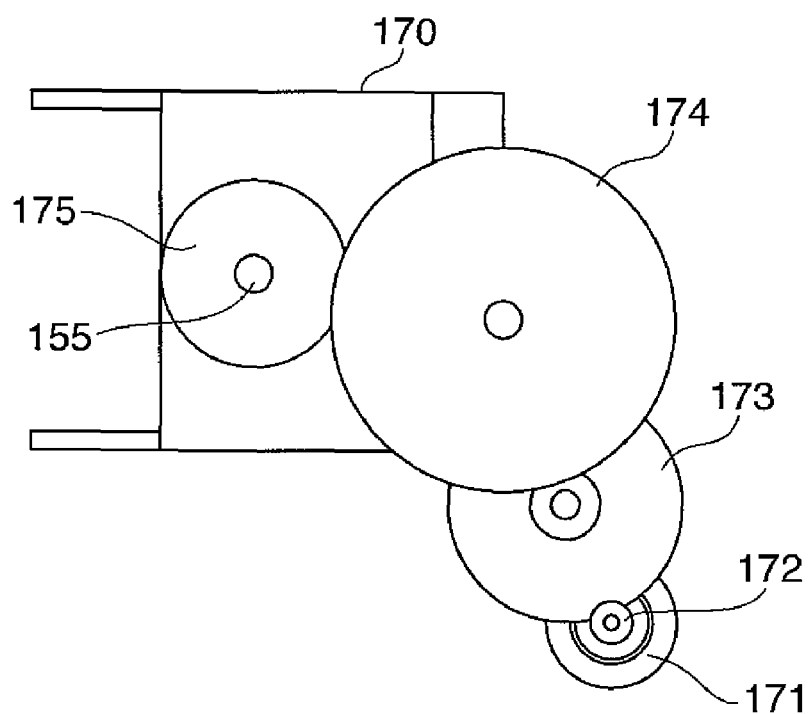

FIGS. 4A and 4B are views of a rough tilting mechanism 152 appearing in FIG. 2. FIG. 4A is a front view, and FIG. 4B a side view.

Reference numeral 170 in FIGS. 4A and 4B designates a tiltable frame which carries the fine panning/tilting mechanism 150 and the rough panning mechanism 151. The mechanisms 150 and 151 installed in the tiltable frame 170 are not shown in these figures. Reference numeral 171 designates a motor as a power source for the rough tilting mechanism 152, and reference numerals 172 to 175 gears for adjusting the rotational speed of the motor 171 and transmitting power. It should be noted that a belt or the like can be used in place of the gears. The motor 171 can be implemented by any type of motor, such as a DC motor, a stepper motor, or an ultrasonic motor, which can perform control for positioning a tilt angle, and an appropriate reduction gear ratio is selected. Alternatively, a direct driving method in which the rough tilting mechanism 152 is directly driven without using gears may be employed. The rough panning mechanism 151 can also drive a rough panning frame by the same method as employed by the rough tilting mechanism 152, and hence description thereof is omitted.

Control for determining an image pickup direction is performed on two axes, i.e. a panning (horizontal) axis and a tilting (vertical) axis. Although the panning axis and the tilting axis are orthogonal to each other, panning control and tilting control are performed by the same control method. Therefore, hereafter, only panning control will be described, and description of tilting control will be omitted.

Figure 5A:
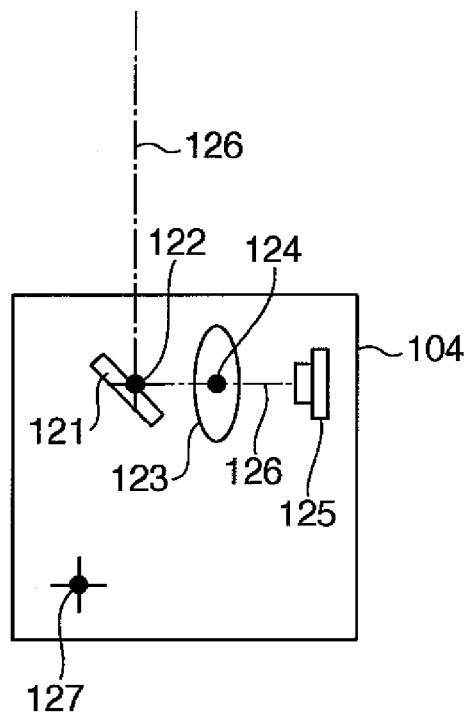
FIGS. 5A and 5B are schematic views of the optical and geometrical relationship in a panning drive section of the tracking image pickup device according to the first embodiment.
Figure 5B:
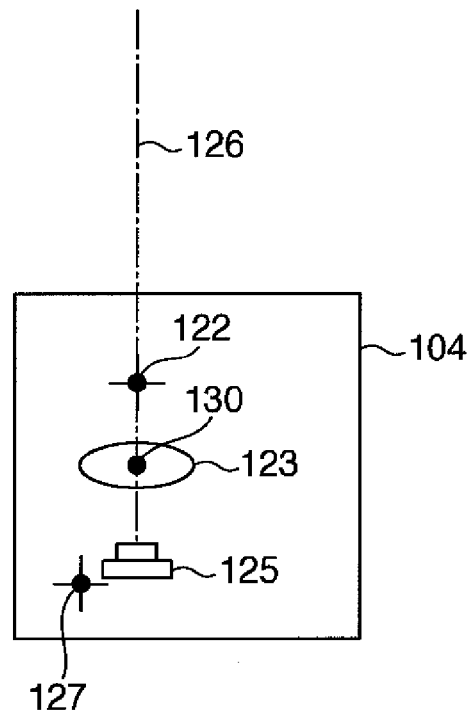

FIGS. 5A and 5B are schematic views of the optical and geometrical relationship in the panning drive section of the tracking image pickup device according to the first embodiment, and in these figures, a virtual lens (thin lens) is used. FIG. 5A is an optical schematic view, and FIG. 5B is a view of an equivalent optical system in which the rotary mirror 121 appearing in FIG. 5A is excluded.

Fine movement of the panning drive section 104 is caused by the rotary mirror 121. In FIG. 5A, reference numeral 122 designates the rotational axis of the rotary mirror 121, i.e. a fine movement-rotational axis. Reference numeral 123 designates a lens for forming an image of an object on the image pickup element 125 implemented e.g. by a CCD or a CMOS, and 124 a lens principal point position thereof. The lens in FIGS. 5A and 5B is a virtual lens, so that computations, including coordinate conversion, are carried out based on the lens principal point 124, as described hereinafter.

The lens 123 may be formed by a single lens or by an optical system comprised of optical elements, such as a plurality of lenses and mirrors. In general, when an optical system formed by a plurality of lenses and an aperture stop e.g. for aberration correction is employed, light beams from an object which are to form an image all pass through an entrance pupil, and hence computations, including coordinate conversion, described hereinafter, are carried out based on an entrance pupil position as a point on a principal light beam in the entrance pupil. Therefore, when the lens 123 can be regarded as a thin virtual lens, or when the entrance pupil position is close to the lens principal point position, coordinate conversion is performed by referring to the lens principal point position. On the other hand, when the entrance pupil position is not close to the lens principal point position, coordinate conversion is performed by referring to the entrance pupil position. In the present invention, a description will be given only of the case where the lens principal point position is referred to, and description of the case where the entrance pupil position is referred to is omitted for simplicity. Reference numeral 126 designates a principal light beam connecting between the lens principal point position and a focal point. Reference numeral 127 designates the rotational axis of the panning drive section 104, i.e. a rough movement-rotational axis. It should be noted that FIG. 5A shows a reference state where an object right exactly in front is to be imaged.

The rotary mirror 121 only turns the direction of a light beam through an angle twice as large as its rotational angle but has any other influence on the image formation. Therefore, FIG. 5A can be expressed as shown in FIG. 5B by eliminating the rotary mirror 121. In this case, an optical lens principal point is located at a position designated by reference numeral 130 in FIG. 5B.

Next, a description will be given of principal point shift due to fine movement.

Figures 6A, 6B:
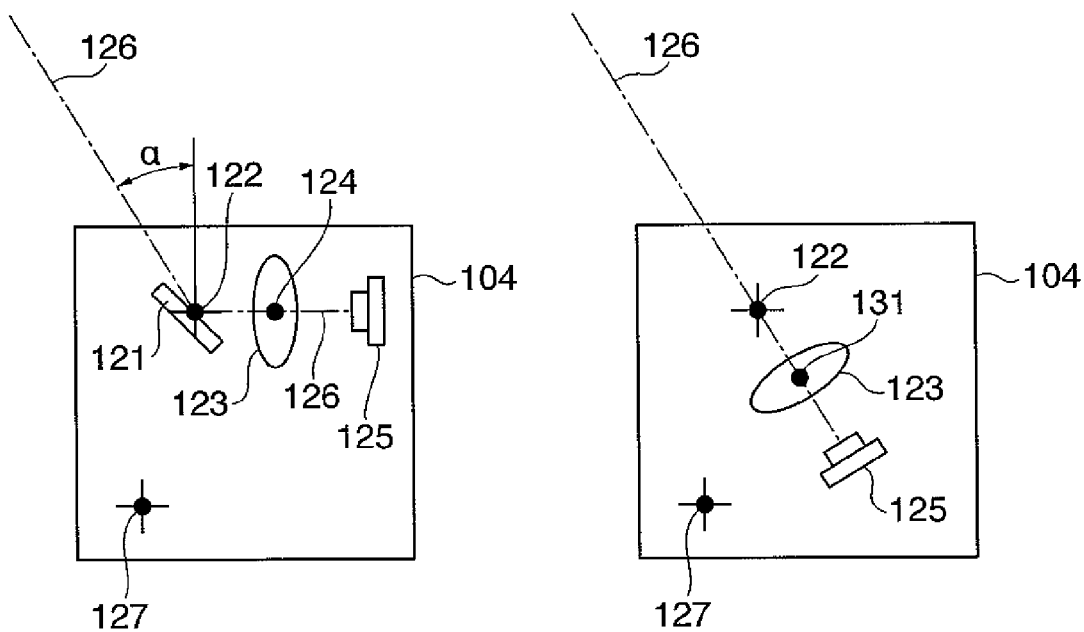
FIGS. 6A and 6B are views useful in explaining principal point shift during fine movement operation.

FIGS. 6A and 6B are views useful in explaining principal point shift during fine movement operation. FIG. 6A is an optical schematic view, and FIG. 6B is a view of an equivalent optical system in which the rotary mirror 121 appearing in FIG. 6A is excluded.

As shown in FIG. 6A, when the rotary mirror 121 is rotated through α/2 degrees, not shown, the principal light beam 126 rotates through α degrees which are twice as large as α/2 degrees. When the rotary mirror 121 is eliminated as in FIG. 5B, a lens principal point 131 can be obtained as shown in FIG. 6B. Thus, it can be understood that a fine movement device, such as the rotary mirror 121, determines a predetermined image pickup direction and a predetermined lens principal point position.

The lens principal point position is obtained by primary conversion used for rotation or deformation of a figure. When a local coordinate system UV having the fine movement-rotational axis 122 as an origin thereof is considered, if the coordinates of the lens principal point position 130 in FIG. 5B are set to (u1, v1), the coordinates of the lens principal point position 131 in FIG. 6B to (u1', v1'), and the rotational angle of the coordinates to θ, the following relation is obtained:

$$\begin{pmatrix} u1' \\ v1' \end{pmatrix} = \begin{pmatrix} \cos\theta & -\sin\theta \\ \sin\theta & \cos\theta \end{pmatrix} \begin{pmatrix} u1 \\ v1 \end{pmatrix} \quad (1)$$

When FIG. 5A is regarded as the reference state as mentioned above, the angle θ of the principal light beam 126 becomes equal to α (θ=α), whereby the direction of principal point shift by the rotation of the rotary mirror 121 and that of the principal light beam 126 are determined.

Next, a description will be given of principal point shift due to rough movement.

Figure 7:
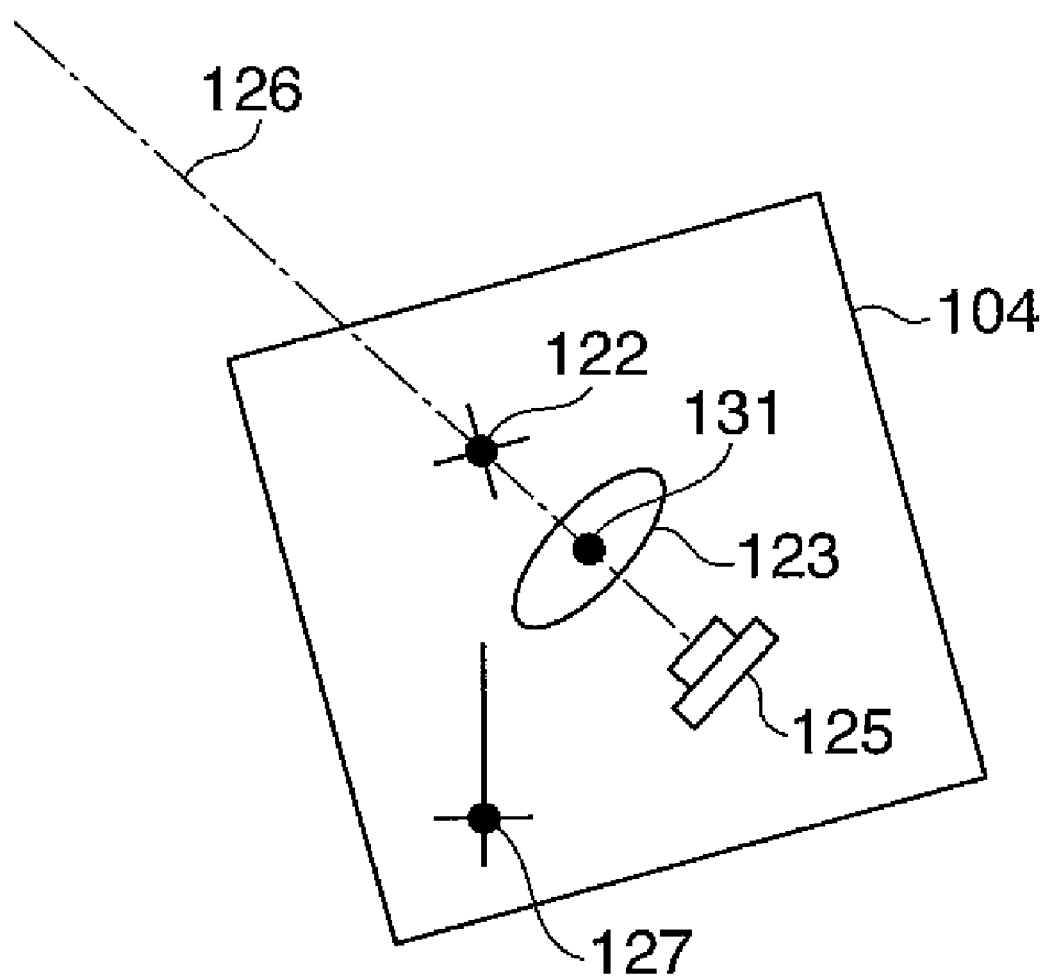
FIG. 7 is a view useful in explaining principal point shift during rough movement operation.

FIG. 7 is a view useful in explaining coordinate conversion performed during rough movement operation. FIG. 7 shows a state of the panning drive section 104 obtained by a rough movement operation which further rotates the panning drive section 104 from the FIG. 6B state in which the fine movement has shifted the lens principal point and turned the direction of the principal light beam.

It is assumed that a rough movement-rotational angle is β and the rough movement-rotational axis 127 is the origin of a global coordinate system XY. Further, it is assumed that before execution of the rough movement operation, the coordinates of the origin of the local coordinate system UV are (x1, y1), and the coordinates of the lens principal point position 131 are (x2, y2). Furthermore, it is assumed that in after the rough movement operation, the coordinates of the origin of the local coordinate system UV are (x1', y1'), and the coordinates of the lens principal point position are (x2', y2'). Then, the following relation is obtained:

$$\begin{pmatrix} x1' \\ y1' \end{pmatrix} = \begin{pmatrix} \cos\beta & -\sin\theta \\ \sin\beta & \cos\theta \end{pmatrix}\begin{pmatrix} x1 \\ y1 \end{pmatrix}, \begin{pmatrix} x2' \\ y2' \end{pmatrix} = \begin{pmatrix} \cos\beta & -\sin\theta \\ \sin\beta & \cos\theta \end{pmatrix}\begin{pmatrix} x2 \\ y2 \end{pmatrix} \quad (2)$$

The relation between an image pickup direction γ and the lens principal point position associated with rough movement and fine movement can be expressed by the following simple equation:

$$\gamma = \alpha + \beta \quad (3)$$

wherein α represents a fine rotation amount (the rotational angle of the rotary mirror 121=α/2, and β represents a rough rotation amount, not shown. Further, the lens principal point position can be derived from Equation (1) and Equation (2).

As is apparent from the above, there exist an infinite number of fine movement-rotational angles α, rough movement-rotational angles β, and lens principal point positions in association with the image pickup direction γ.

Hereafter, a controlled variable calculating process for arithmetically controlling the image pickup direction based on a fine movement-rotational angle, a rough movement-rotational angle, and a lens principal point position of the optical system will be described with reference to FIG. 8.

Figure 8:
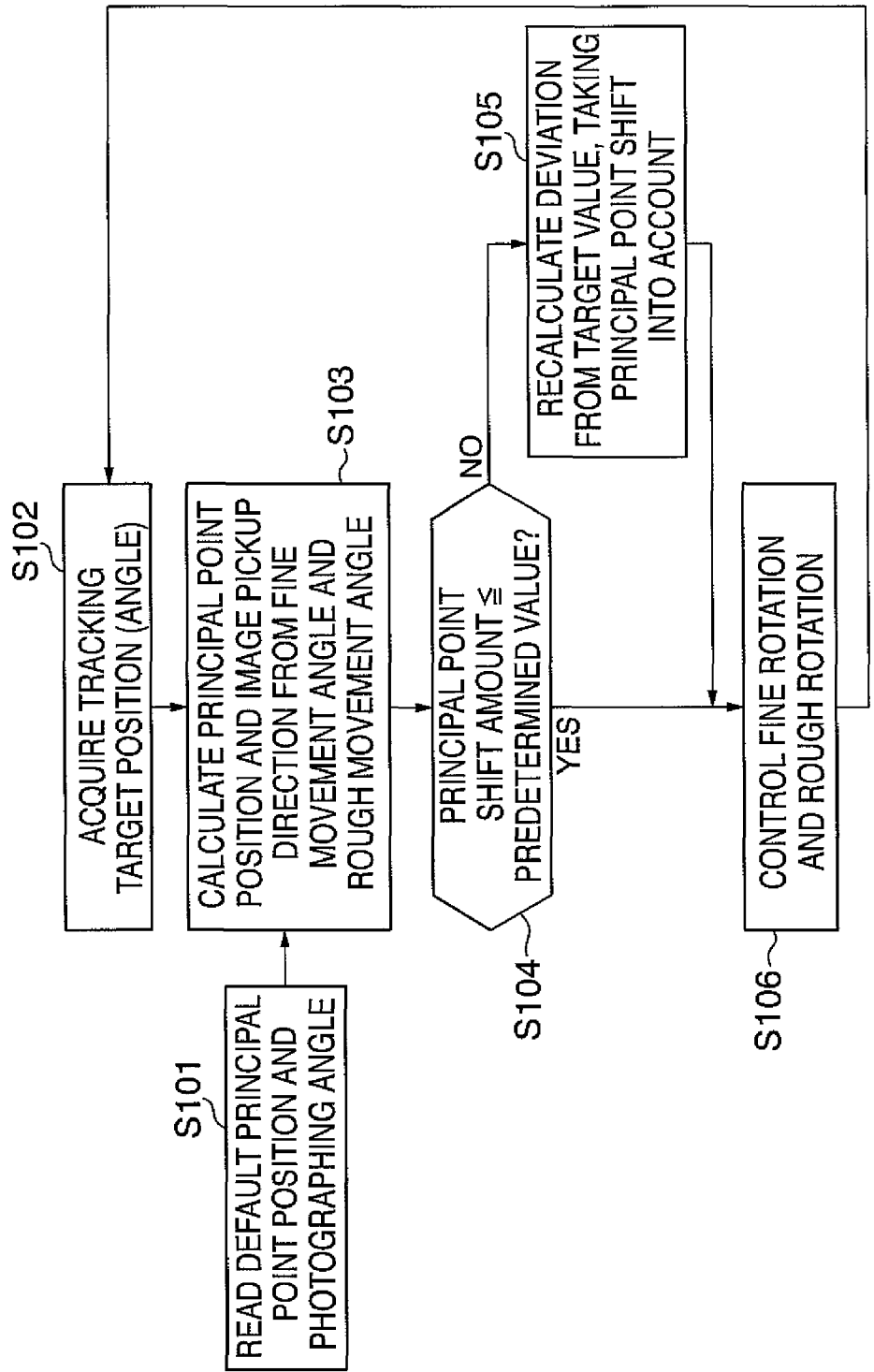
FIG. 8 is a flowchart of a controlled variable calculating process executed by the tracking image pickup device according to the first embodiment.

FIG. 8 is a flowchart of the controlled variable calculating process executed by the tracking image pickup device according to the first embodiment.

First, in a step S101, the local coordinate origin and the optical lens principal point position 130 are read in the reference state (default state) in FIG. 5A. On the other hand, in a step S102, a tracking target position (or angle) is acquired from the tracking target-detecting section 111.

Then, in a step S103, a lens principal point position and a principal light beam direction are determined by the above Equation (1) based on the reference information read in the step S101 and fine-rotational and rough movement-rotational angles, and an image pickup direction is calculated. In the following step S104, the difference between the reference lens principal point position and the lens principal point position currently drivingly controlled, i.e. the principal point shift amount is calculated, and then it is determined whether the calculated principal point shift amount is not larger than a predetermined value. If the principal point shift amount is not larger than the predetermined value, judging that the deviation amount of the lens principal point position, i.e. the principal point shift is small enough to be ignored, and the process proceeds to a step S106. On the other hand, if the principal point shift amount is larger than the predetermined value, the process proceeds to a step S105.

In the step S105, since the principal point shift amount is large, the amount of deviation from the tracking target is calculated again taking the principal point shift into account. The step S106 is for executing rotational control of fine movement and rough movement, wherein turning angles are controlled taking into account the characteristics of the drive mechanism for fine movement and rough movement. Rough movement is controlled with a lower frequency response characteristic than fine movement is while fine movement is controlled with a higher frequency response characteristic than rough movement is, such that the deviation amount is eliminated.

The steps S101 to S106 are repeatedly carried out, whereby desired control is executed. It should be noted that the control flow may be configured such that the step S101 is carried out only once.

According to the first embodiment, the fine movement operations of the panning drive section 104 and the tilting drive section 107 are caused by the rotary mirror 121 (see 121 in FIG. 6A), and the predetermined image pickup direction and lens principal point position can be set by the fine movement device, such as the rotary mirror 121. More specifically, the shift position of the lens principal point position (see 131 in FIG. 6B) and the image pickup direction (see 126 in FIG. 6B) are obtained by referring to the position of the fine movement-rotational axis (see 122 in FIGS. 6A and 6B) which is the rotational axis of the rotary mirror 121 (i.e. the fine movement-rotational axis position), the position of the rotational axis (see 127 in FIGS. 6A and 6B) of the panning drive section 104 or the tilting drive section 107 (i.e. the rough movement-rotational axis position), and the position of the lens principal point (i.e. the principal point position).

The fine movement mechanisms of the respective pan and tilting drive sections 104 and 107 of the tracking image pickup device according to the first embodiment are thus configured to rotatingly drive only a part (e.g. the rotary mirror 121) of the image pickup system, differently from the prior arts in which the whole image pickup system is rotatingly driven. Therefore, the moment of inertia is reduced, which makes it possible to achieve high-speed operation without sacrificing the rigidity of the device, and it becomes easier to design the device. Further, improvement of resolution of fine movement makes it possible to easily enhance accuracy in the image pickup direction. Thus, a high-speed and high-accuracy tracking image pickup device provided with the fine movement function and the rough movement function can be realized.

Next, a description will be given of a second embodiment of the present invention. In the second embodiment, control of fine movement and rough movement, which is performed by a differential operation section for calculating the deviation amount, and exceptional processing executed during control non-applicable time will be described.

Figure 9:
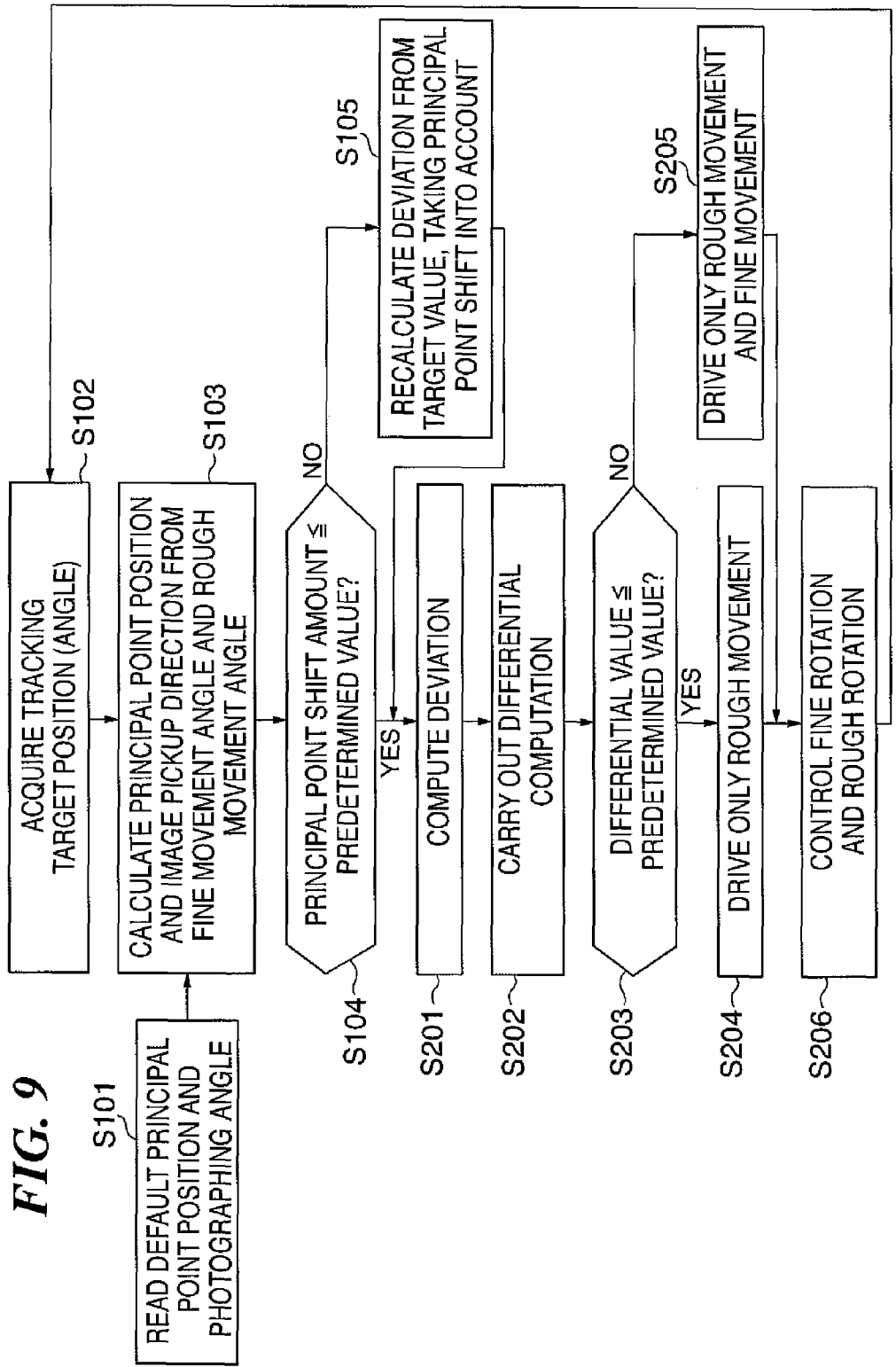
FIG. 9 is a flowchart of a tracking process executed by a tracking image pickup device according to a second embodiment of the present invention.

FIG. 9 is a flowchart of a tracking process executed by a tracking image pickup device according to the second embodiment. Steps similar to those in FIG. 8 are designated by identical step numbers, and description thereof is omitted.

Steps S101 to S105 are identical to those in FIG. 8. If the principal point shift amount is not larger than a predetermined value, the process proceeds to a step S201.

In the step S201, the amount of deviation between the image pickup direction and the tracking target is calculated.

Then, in a step S202, the calculated deviation amount is subjected to first-order differential operation, and in a step S203, it is determined whether a value obtained by the differential operation is not larger than a predetermined value. If the differential value is not larger than the predetermined value, the process proceeds to a step S204, whereas if the differential value is larger than the predetermined value, the process proceeds to a step S205. It should be noted that this predetermined value is set to a speed which can be tracked by rough movement (e.g. a maximum value).

In the step S204, rough movement drive computation for drivingly controlling panning only by rough movement is performed. The step S204 is applied when it is determined that the tracking can be performed only by rough movement. While in the step S205, rough-and-fine movement drive computation for drivingly controlling panning using both rough movement and fine movement is performed. Then, in a step S206, a fine movement operation and a rough movement operation are both performed based on a result obtained in the step S204 or S205.

The deviation amount is thus differentiated, whereby the process can be configured such that when a change in deviation is rapid, both fine movement and rough movement are used, and when a change in deviation is slow, only rough movement is used.

Figure 10A:
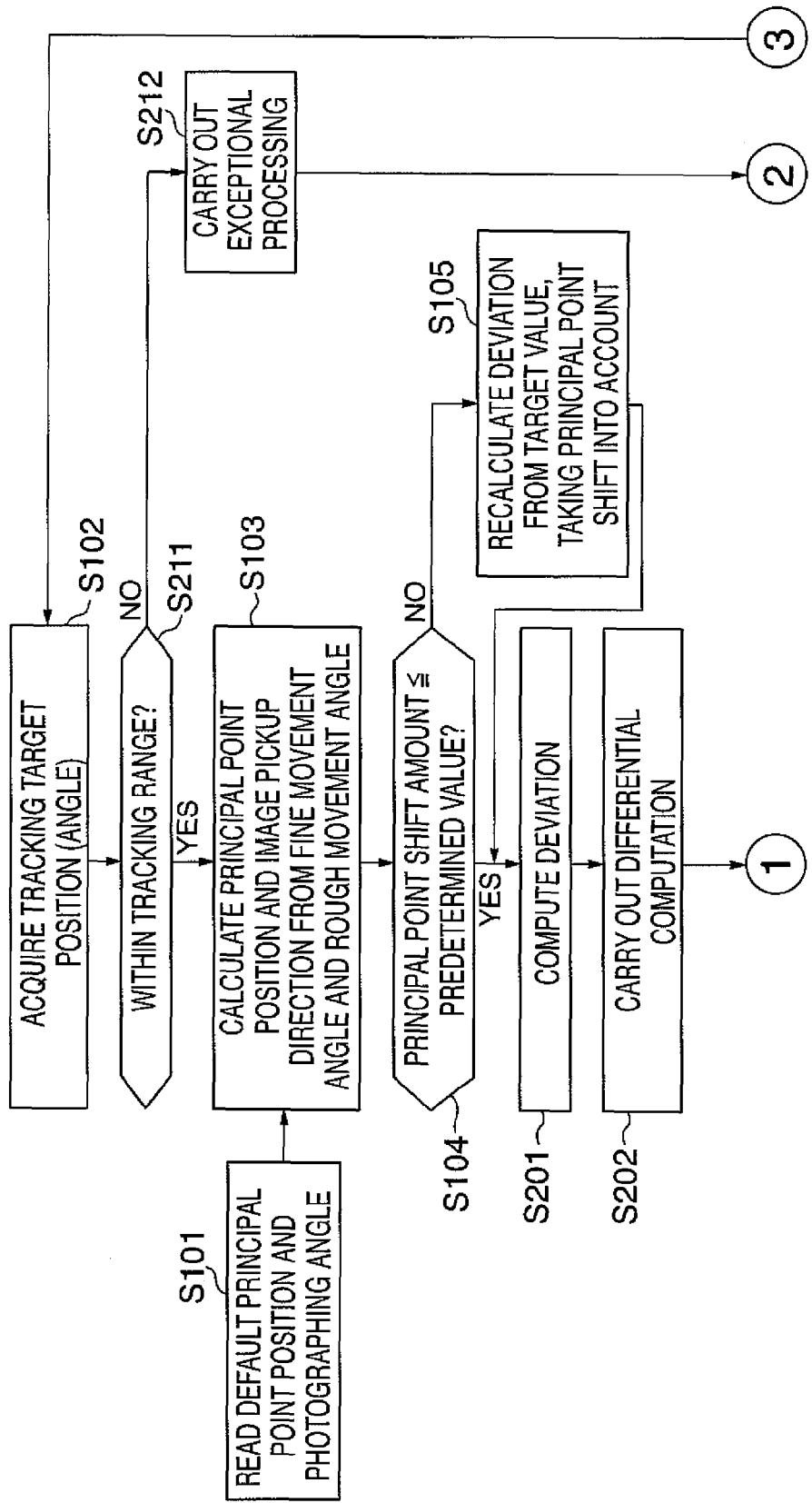
FIGS. 10A and 10B are flowcharts of the tracking process including exceptional processing executed during control non-applicable time.
Figure 10B:
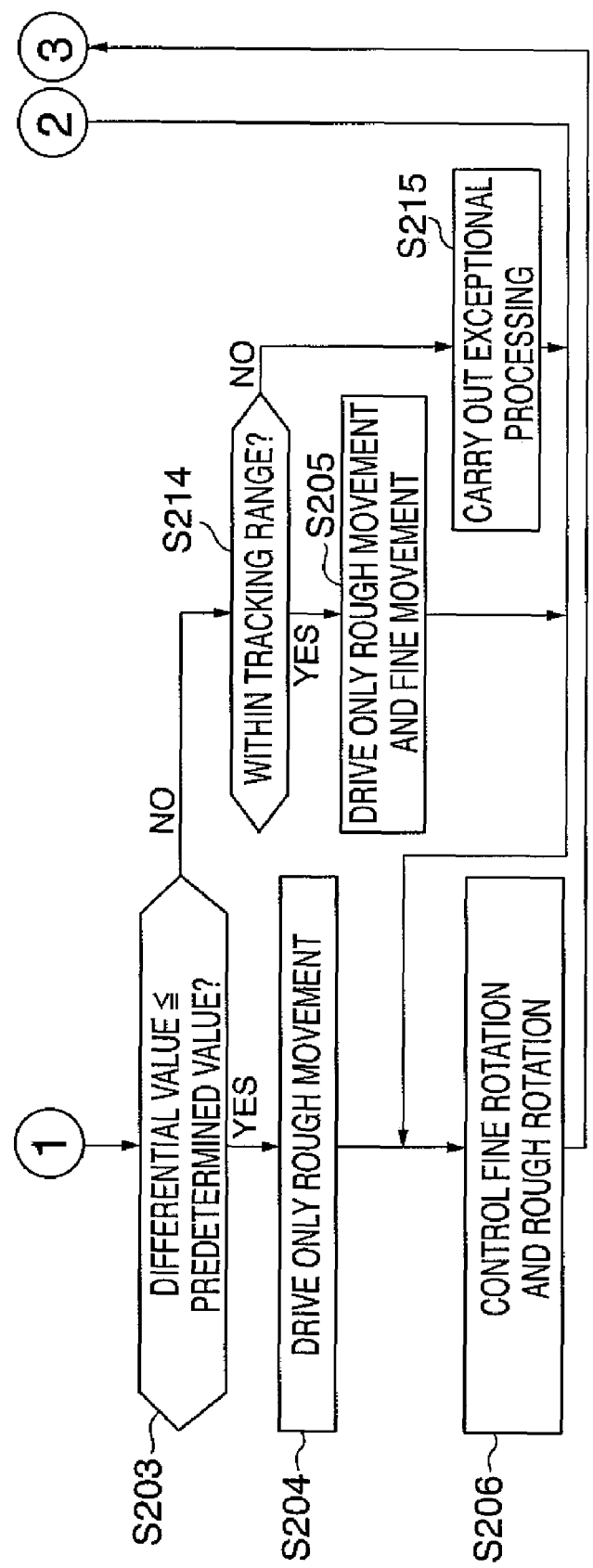

FIGS. 10A and 10B are flowcharts of the tracking process including exceptional processing executed during control non-applicable time. Steps similar to those in FIG. 9 are designated by identical step numbers, and description thereof is omitted.

When a tracking target position (angle) is obtained in the step S102, the process proceeds to a step S211, wherein it is determined whether or not the tracking target is within a range where tracking can be performed (tracking range). The term "tracking" here means "to image a tracking target in a central part of a screen". If the tracking target is in the vicinity of the tracking range and can be imaged, but the image cannot be moved to the central part of the screen by panning drive, or if the tracking target does not exist and hence cannot be detected, the process proceeds to a step S212, wherein exceptional processing is executed. On the other hand, if the tracking target is within the tracking range, the process proceeds to the step S201 via the steps S103 and S104.

In the step S212, the following exceptional processing is executed: (1) When the tracking target cannot be detected, the image pickup direction is cleared to an initial value. On the other hand, when the tracking target is outside the tracking range and hence cannot be detected, the detection state where the tracking target cannot be detected is held over a predetermined time period; and (2) a rough movement operation and a fine movement operation are both performed to a position enabling tracking of the tracking target as much as possible, and the control to this position is maintained.

If it is determined in the step S203 that the first-order differential value is larger than the predetermined value, the process proceeds to a step S214. In the step S214, it is determined, based on the differential value obtained in the step S202, the panning position, and so forth, whether or not tracking by both fine movement and rough movement can be performed.

If it is determined in the step S214 that tracking can be performed, the process proceeds to a step S205. On the other hand, if it is determined that tracking cannot be performed, the process proceeds to a step S215, wherein the exceptional processing is executed. Cases where tracking cannot be performed include a case where the moving speed of a tracking target is so fast that the tracking target cannot be caught up with.

In the step S215, the following processing is carried out as exceptional processing to be executed when tracking cannot be performed: (1) When the tracking target is missed though tracking is performed at a maximum speed, this status is maintained; (2) even if the tracking target is missed though tracking is performed at the maximum speed, tracking in the same direction is continued; and (3) when a zoom function is provided, a zooming operation to the wide side is performed.

According to the second embodiment, a ratio between rough movement and fine movement and possibility of tracking can be determined based on first-order differential operation of the deviation amount, i.e. the speed of change in deviation. Further, it is possible to enhance controllability by carrying out the exceptional processing.

Next, a description will be given of a third embodiment. The third embodiment is distinguished from the first embodiment in which the rough movement-rotational axis, the fine movement-rotational axis, and the lens principal point are different from each other, in that some or all of them coincide with each other.

Figure 11:
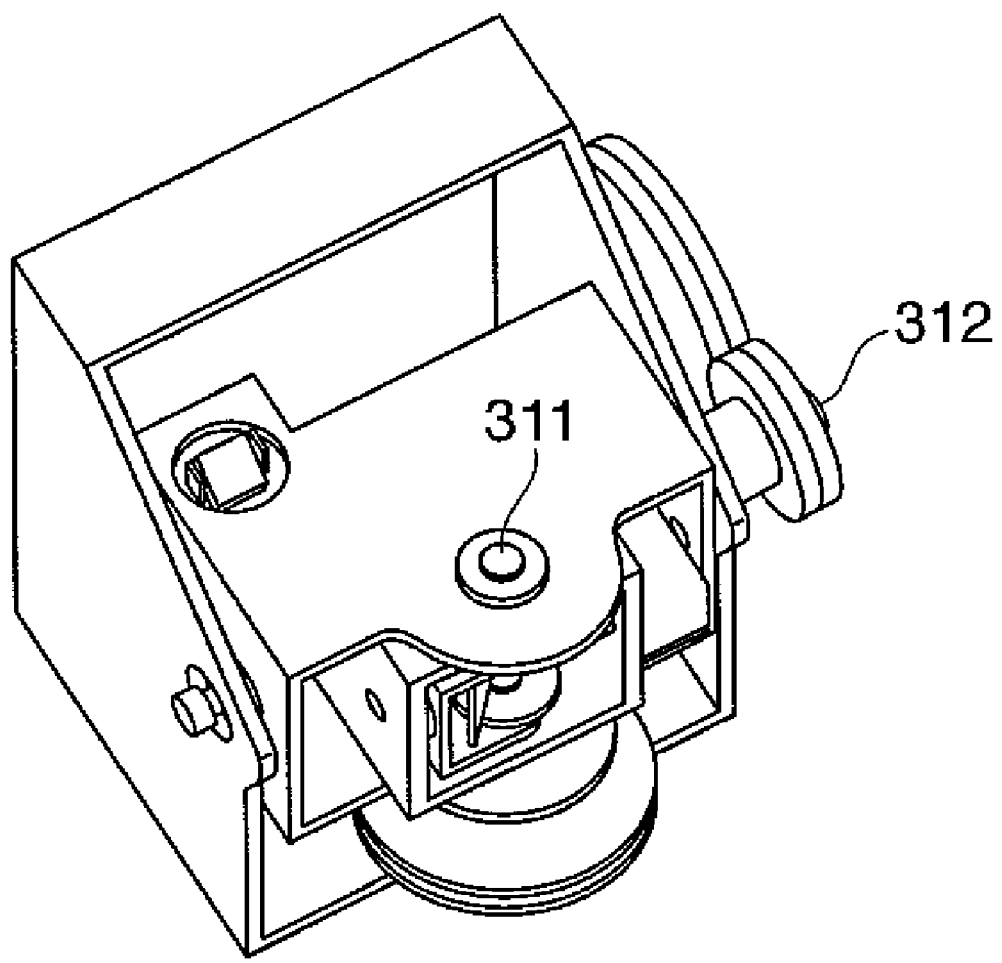
FIG. 11 is a perspective view of an entire panning/tilting mechanism of a tracking image pickup device according to a third embodiment of the present invention.

FIG. 11 is a perspective view of a whole panning/tilting mechanism according to the third embodiment.

Reference numeral 311 designates a rough movement-rotational axis for panning and coincides with the fine panning shaft (fine movement-rotational axis for panning) 165 in FIG. 3. Further, reference numeral 312 designates a rough movement-rotational axis for tilting and is configured such that it coincides with the rough movement-rotational axis 166 for tilting in FIG. 3.

First, a description will be given of optical and geometrical relationship in the panning drive section in the case where the fine movement-rotational axis and the rough movement-rotational axis coincide with each other.

Figure 12A:
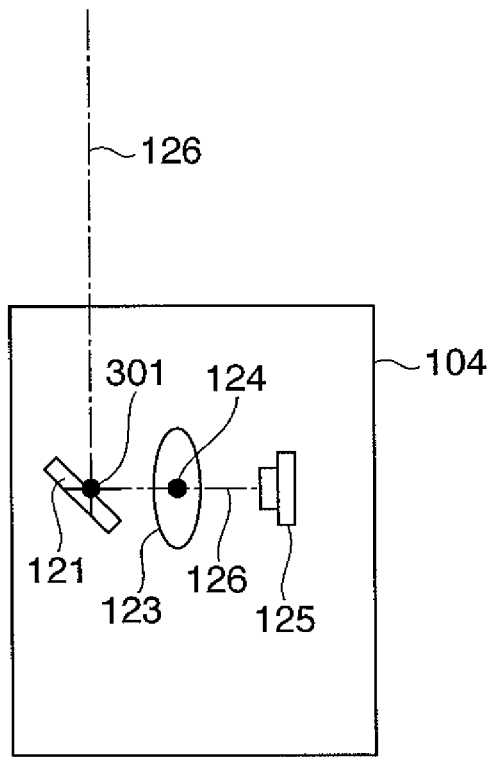
FIGS. 12A and 12B are schematic views of optical and geometrical relationship in a panning drive section of the tracking image pickup device according to the third embodiment.
Figure 12B:
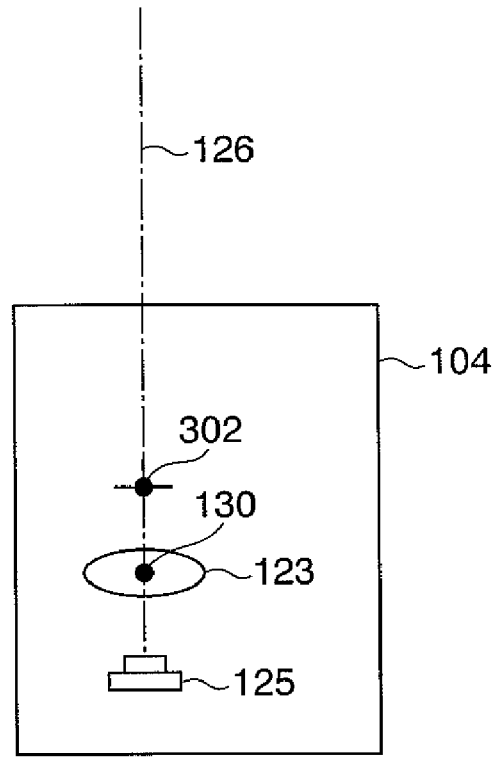

FIGS. 12A and 12B are schematic views showing optical and geometrical relationship in the panning drive section according to the third embodiment. FIG. 12A is an optical schematic view showing the case where the fine movement-rotational axis and the rough movement-rotational axis coincide with each other, and FIG. 12B is an equivalent view of an optical system in which a rotary mirror 121 appearing in FIG. 12A is excluded.

Reference numeral 301 in FIG. 12A and reference numeral 302 in FIG. 12B designate a point where the fine movement-rotational axis and the rough movement-rotational axis are located in a coinciding manner. It can be considered that FIGS. 12A and 12B shows a case where the fine movement-rotational axis 122 and the rough movement-rotational axis 127 in FIG. 5A made coincident with each other at this point. In FIG. 12B, an imaging rotational angle $\gamma 5$ in this case is obtained as the sum of a fine movement-rotational angle $\alpha 5$ and a rough movement-rotational angle $\beta 5$:

$$\gamma 5 = \alpha 5 + \beta 5$$

Further, a principal point position (x5, $\gamma 5y2$) obtained by rotation through $\gamma 5$ from an initial position (x5, $\gamma 5y1$) of the principal point position can be expressed by the following equation:

$$\begin{pmatrix} x5' \\ y5' \end{pmatrix} = \begin{pmatrix} \cos\gamma 5 & -\sin\gamma 5 \\ \sin\gamma 5 & \cos\gamma 5 \end{pmatrix} \begin{pmatrix} x5 \\ y5 \end{pmatrix}$$

As described above, computation, which is performed using the local coordinate system and the global coordinate system in the first embodiment, can be performed using a single coordinate system, which contributes to simplification of computation.

Next, a description will be given of optical and geometrical relationship in a panning drive section in the case where the rough movement-rotational axis and the lens principal point coincide with each other.

FIGS. 13A and 13B are schematic views showing optical and geometrical relationship in a panning drive section of a variation of the third embodiment. FIG. 13A is an optical schematic view showing the case where the rough movement-rotational axis and the lens principal point are made coincident with each other, and FIG. 13B is a view of an equivalent optical system in which the rotary mirror 121 appearing in FIG. 13A is excluded.

Reference numeral 321 designates a point where the rough movement-rotational axis and the lens principal point are located in a coinciding manner. In this case, the lens principal point position can be obtained by movement computation using a single coordinate system, as in the above case, which contributes to simplification of computation.

Next, a description will be given of optical and geometrical relationship in a panning drive section in the case where the fine movement-rotational axis and the lens principal point are made coincident with each other.

Figure 14A:
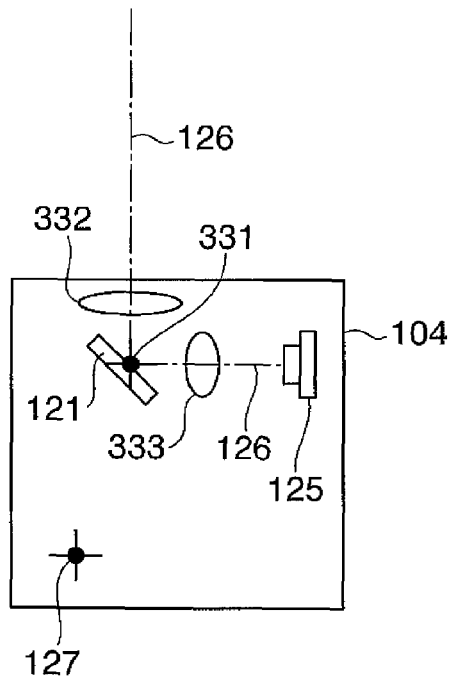
FIGS. 14A and 14B are schematic views showing optical and geometrical relationship in a panning drive section of a variation of the third embodiment of the present invention.
Figure 14B:
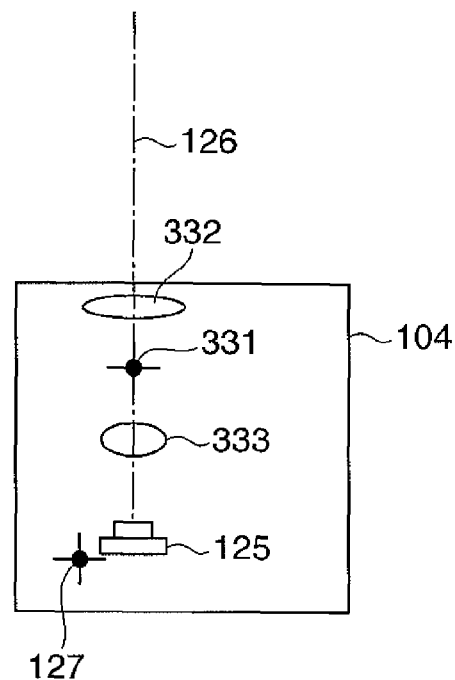

FIGS. 14A and 14B are schematic views showing optical and geometrical relationship in a panning drive section according to a variation of the third embodiment. FIG. 14A is an optical schematic view showing the case where the fine movement-rotational axis and the lens principal point are made coincident with each other, and FIG. 14B is a view of an equivalent optical system in which the rotary mirror 121 appearing in FIG. 14A is excluded.

When the panning drive section is constructed using a single lens, interference occurs between the lens principal point and the rotary mirror 121 as the fine movement-rotational axis, and hence it is impossible to configure the panning drive section such that the fine movement-rotational axis and the lens principal point coincide with each other. However, when an optical system formed by combination of a plurality of optical elements is used, the above configuration is possible. In the present case, the optical system is formed by optical elements designated by reference numerals 332 and 333 in FIGS. 14A and 14B. Reference numeral 331 designates a point where the lens principal point and the fine movement-rotational axis are located in a coinciding manner. In this case as well, the lens principal point position can be obtained by movement computation using a single coordinate system, which contributes to simplification of computation.

Next, a description will be given of optical and geometrical relationship in a panning drive section in a case where the fine movement-rotational axis, the rough movement-rotational axis, and the lens principal point are all are made coincident with each other.

Figure 15A:
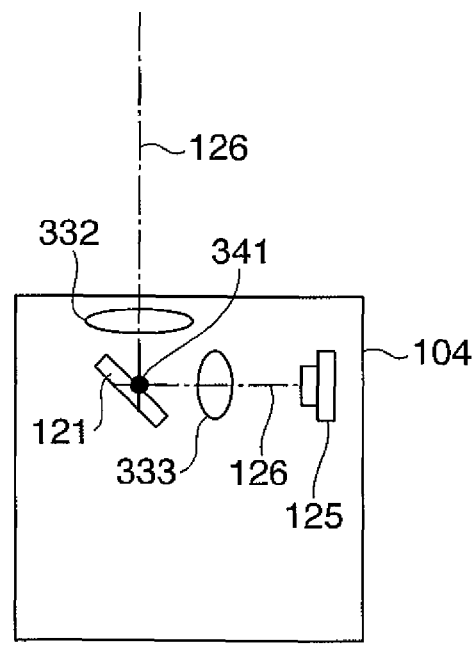
FIGS. 15A and 15B are schematic views showing optical and geometrical relationship in a panning drive section of a variation of the third embodiment of the present invention.
Figure 15B:
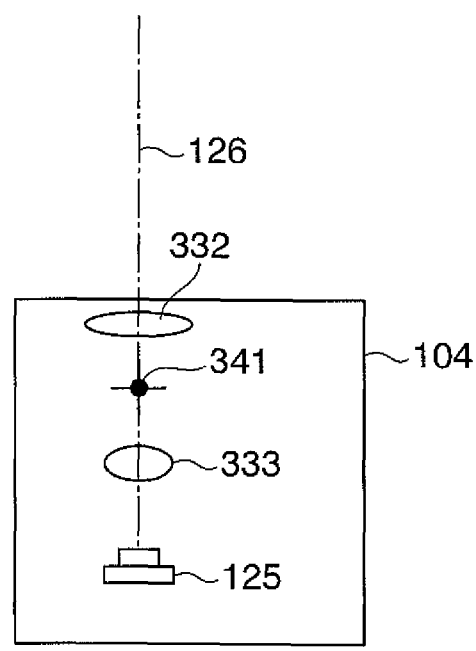

FIGS. 15A and 15B are schematic views showing optical and geometrical relationship in the panning drive section according to another variation of the third embodiment. FIG. 15A is an optical schematic view showing the case where the fine movement-rotational axis, the rough movement-rotational axis, and the lens principal point are all are made coincident with each other, and FIG. 15B is a view of an equivalent optical system in which the rotary mirror 121 appearing in FIG. 15A is excluded.

Reference numeral 341 designates a point where the lens principal point, the fine movement-rotational axis, and the rough movement-rotational axis are located in a coinciding manner. In the present case, the lens principal point does not shift as in the above cases, and an image pickup direction can be obtained as the sum of a rough movement-rotational angle and a fine movement-rotational angle. This makes it possible to further simplify computation. It should be noted that computation of the image pickup direction may be performed using not the lens principal point position, but the entrance pupil position, as mentioned in the first embodiment.

As described above, by positioning the fine-rotational axis, the rough-rotational axis, and the lens principal point as deemed appropriate, it is possible to simplify computation of an image pickup direction.

Next, a description will be given of a fourth embodiment of the present invention. The fourth embodiment is distinguished from the above described embodiments in which the optical system is configured such that the lens principal point does not move, in that a zoom lens is used so as to change the lens view angle range and the magnification.

Figure 16A:
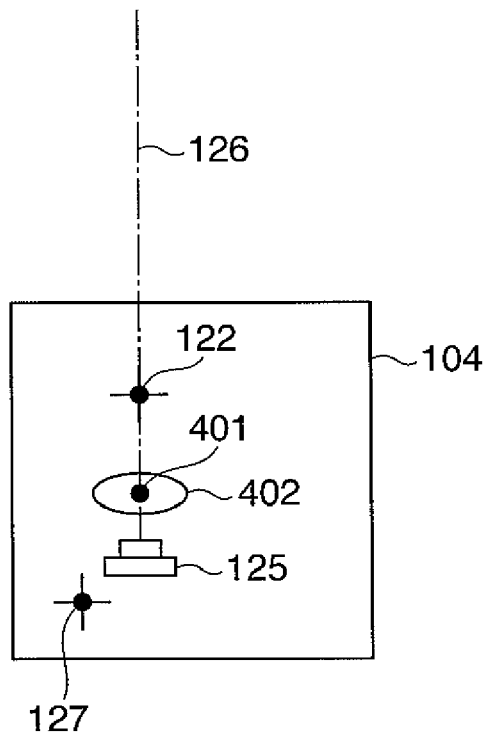
FIGS. 16A and 16B are views useful in explaining shift of the lens principal point position due to zoom operation of the tracking image pickup device according to the fourth embodiment.
Figure 16B:
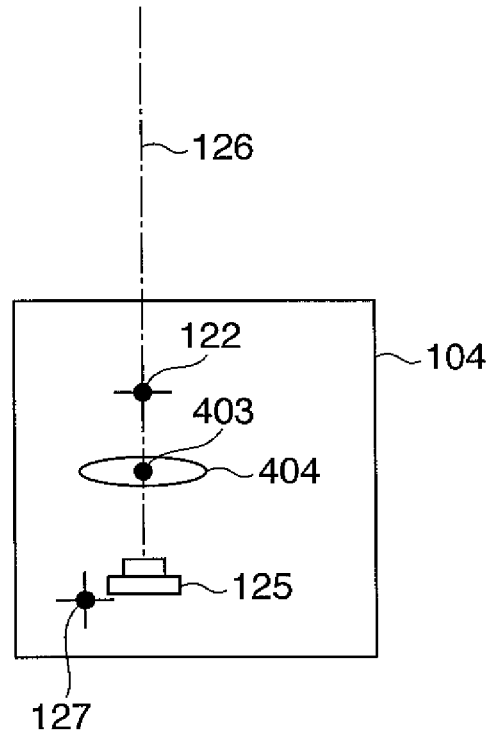
Figure 19:
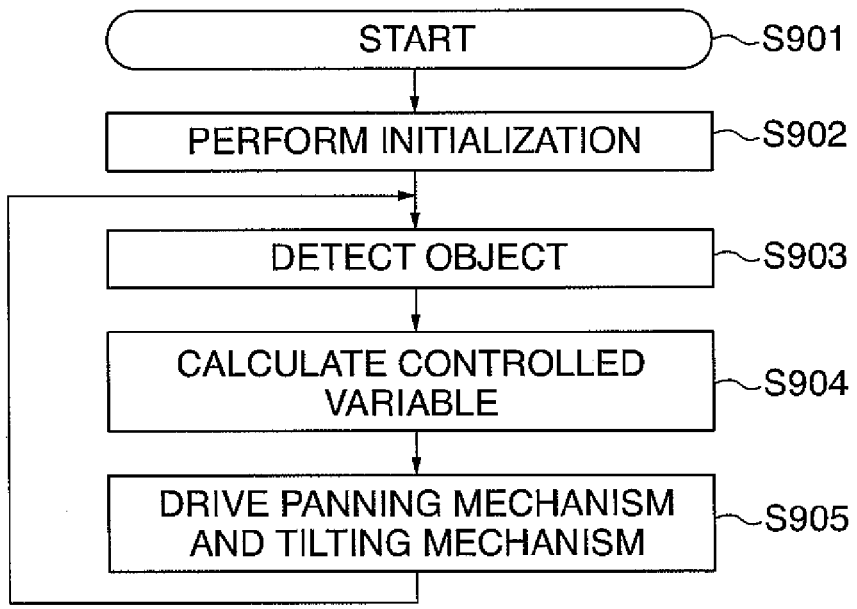
FIG. 19 is a flowchart of a general panning and tilting control process executed by a conventional tracking image pickup device.

FIGS. 16A and 16B are views useful in explaining a shift of the lens principal point position due to a zoom operation of a tracking image pickup device according to the fourth embodiment, in which FIG. 16A shows a wide-angle side, and FIG. 16B shows a telephoto side.

In the case where a zoom lens is used, a part of the optical system is moved along the optical axis, whereby the magnification and the focus of the zoom lens is adjusted. In FIGS. 16A and 16B, reference numerals 401 and 403 designate the lens principal point position, and 402 and 404 the optical system. The zoom lens changes its focal point according to a zoom magnification, whereby the lens principal point position is changed.

FIG. 17 is a flowchart of a tracking process according to the fourth embodiment. Steps similar to those in FIG. 8 are designated by identical step numbers, and description thereof is omitted.

The tracking process of the present embodiment is different from that of the first embodiment only in a step S401. In the first embodiment, the lens principal point position is fixed, so that it is not required to acquire a lens principal point position for each loop of the process. In contrast, in the fourth embodiment, since the zoom lens is provided, the lens principal point position varies with a zoom magnification, and therefore processing (step S401) for acquiring a lens principal point position is necessitated. In the present embodiment, this information is reflected in the processing following the step S401, whereby the processing similar to that in the first embodiment can be carried out.

Next, a description will be given of cancellation of a shift of the lens principal point position due to a zoom operation.

FIGS. 18A and 18B are views useful in explaining how to cancel a principal point shift due to a zoom operation.

In an example shown in FIG. 18A, members 401, 402, and 125 in the optical system in FIG. 16A are shifted to respective positions indicated by 401', 402' and 125'. In an example shown in FIG. 18B, members 403, 404, and 125 in the optical system in FIG. 16B are shifted to respective positions indicated by 403', 404' and 125".

By thus shifting the whole optical system according to a zoom magnification, the shift of the lens principal point position due to the zoom operation can be cancelled. It should be noted that not the whole optical system but only the image pickup element and some of the lenses may be shifted.

According to the fourth embodiment, optimum tracking control and energy saving in computation of an image pickup direction can also be achieved in an optical system, such as a zoom lens, in which its lens principal point position is moved.

When computation is performed based on an entrance pupil position, the entrance pupil position is moved due to zoom operation. In this case as well, as mentioned hereinbefore, computation can be performed just as in the case where the lens principal point position is used.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

In this case, the program is supplied directly from a storage medium storing the same or by downloading the same via a network from another computer, a database, or the like, not shown, connected to the Internet, a commercial network, a local area network, or the like.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2005-250114 filed Aug. 30, 2005, which is hereby incorporated by reference herein in its entirety.

What is claimed is:

1. A tracking image pickup device comprising:
an image pickup section that has a predetermined optical system and acquires an image pickup signal through the optical system;
a tracking target-detecting section that detects a tracking target from the image pickup signal acquired by said image pickup section;
a drive section that has a fine movement part formed by a part of the optical system, and a rough movement part, so as to turn the tracking image pickup device in a panning or tilting direction;
a control section that drivingly controls the drive section such that an amount of deviation between the tracking target and an image pickup direction of the tracking image pickup device is reduced; and
an image pickup direction-computing section that determines the image pickup direction of the tracking image pickup device based on a fine-rotational axis position as a position of a rotational axis of said fine movement part, a rough-rotational axis position as a position of a rotational axis of said rough movement part, and a lens principal point position or an entrance pupil position of the predetermined optical system;
wherein said rough movement part is controlled with a lower frequency response characteristic than said fine movement part is, while said fine movement part is controlled with a higher frequency response characteristic than said rough movement part is.

2. A tracking image pickup device comprising:
an image pickup section that has a predetermined optical system and acquires an image pickup signal through the optical system;
a tracking target-detecting section that detects a tracking target from the image pickup signal acquired by said image pickup section;
a drive section that has a fine movement part formed by a part of the optical system, and a rough movement part, so as to turn the tracking image pickup device in a panning or tilting direction;
a control section that drivingly controls the drive section such that an amount of deviation between the tracking target and an image pickup direction of the tracking image pickup device is reduced;
an image pickup direction-computing section that determines the image pickup direction of the tracking image pickup device based on a fine-rotational axis position as a position of a rotational axis of said fine movement part, a rough-rotational axis position as a position of a rotational axis of said rough movement part, and a lens principal point position or an entrance pupil position of the predetermined optical system; and
a differential operation section that carries out first-order differential operation of an amount of deviation between the tracking target and the image pickup direction, and a fine movement control section that controls a fine movement amount of said fine movement part via said drive section and a rough movement control section that controls a rough movement amount of said rough movement part via said drive section based on a result of the differential operation by said differential operation section;
wherein when a first-order differential value obtained by said differential operation section is not larger than a predetermined value, said rough movement control section and said fine movement control section perform driving only by rough movement.

3. A tracking image pickup device as claimed in claim 2, wherein the predetermined value of the first-order differential value obtained by said differential operation section corresponds to a maximum value of a rough movement tracking speed.

* * * * *